United States Patent [19]

Mutter

[11] 4,343,384
[45] Aug. 10, 1982

[54] CONNECTOR APPARATUS FOR ELECTRICALLY CONDUCTIVE GUIDE RAILS

[75] Inventor: Alfred Mutter, Rheinweiler, Fed. Rep. of Germany

[73] Assignee: Wampfler GmbH, Weil am Rhein-Märkt, Fed. Rep. of Germany

[21] Appl. No.: 99,051

[22] Filed: Nov. 30, 1979

[30] Foreign Application Priority Data

Dec. 2, 1978 [DE] Fed. Rep. of Germany ....... 2852267

[51] Int. Cl.$^3$ .............................................. B60M 1/00
[52] U.S. Cl. ............................... 191/22 R; 339/256 R
[58] Field of Search .................. 191/22 R, 29 R, 44.1; 339/256 R, 259 R, 256 T

[56] References Cited

U.S. PATENT DOCUMENTS 2,866,174 12/1958 Görike .......................... 339/256 R X
2,933,567 4/1960 Mageoch ........................ 191/44.1 X
4,168,880 9/1979 Tesch ............................... 339/259 R Primary Examiner—Richard A. Schacher
Attorney, Agent, or Firm—Pollock, Vande Sande & Priddy

[57] ABSTRACT

An improved mechanical-electrical connector apparatus (3) is disclosed which is particularly suited for joining electrical current carrying rail segments (1, 2) having an axially slotted (5, 6) tube configuration within which a sliding contact can ride. Each end of each rail segment is provided with a circumferentially extending notch (4, 6) opening into the slot (5, 6) on opposite sides. A short connector section of slotted tube (3) is provided with a resilient tongue (7, 8) extending radially within the tube section (3) at each end so that the tongues (7, 8) fit into the notches (4, 6) when the rail segments (1, 2) are inserted into the connector section (3). The rails may be used for guiding and supplying current to a trolley or the like.

8 Claims, 1 Drawing Figure

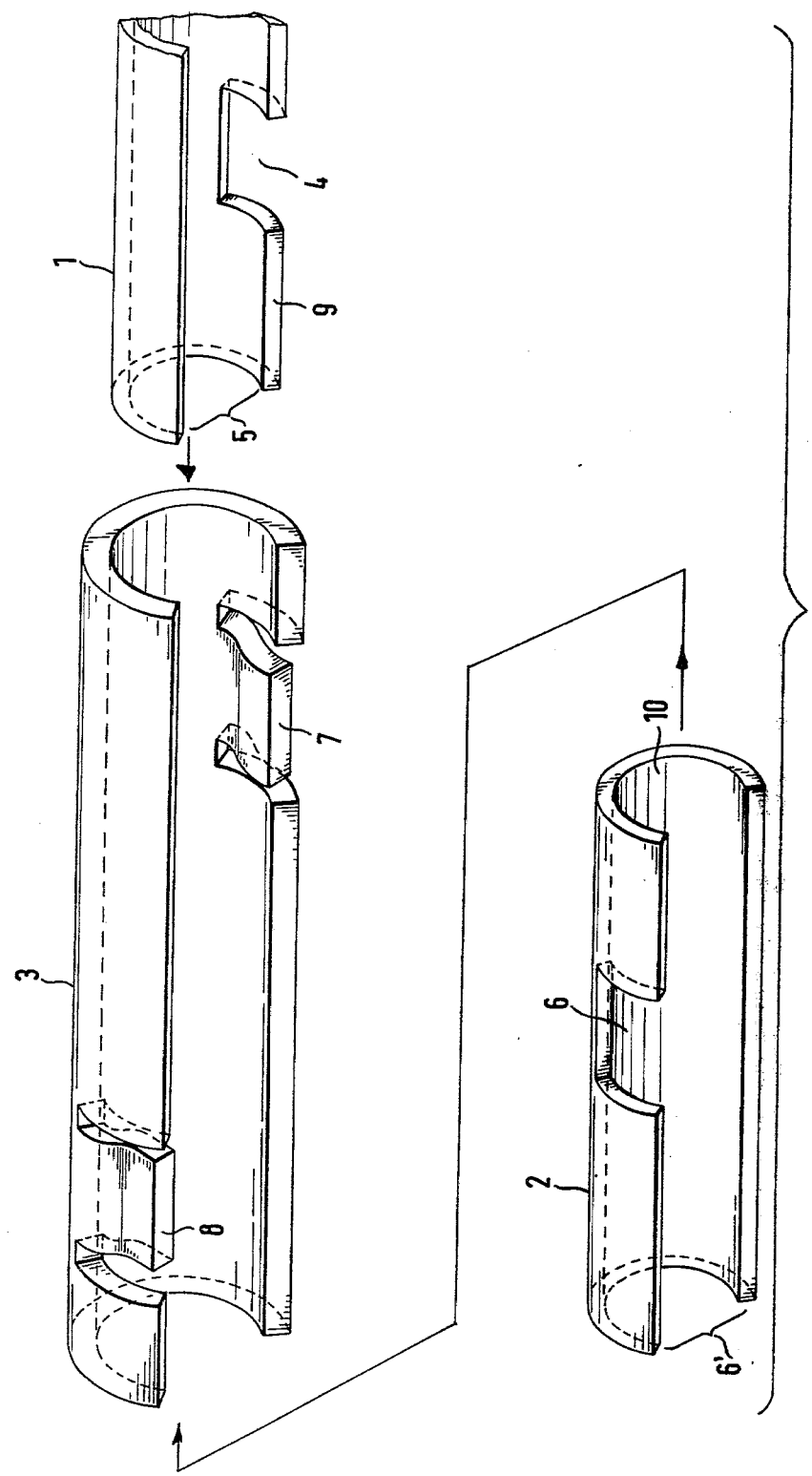

CONNECTOR APPARATUS FOR ELECTRICALLY CONDUCTIVE GUIDE RAILS

DESCRIPTION

1. Technical Field

The invention relates to an improved connector apparatus for use with electrical conductors, particularly a connector for electrically conductive rail segments of the type used for guiding and supplying motive power to a trolley or the like which is in sliding or gliding contact therewith.

2. Background Art

Electrically conductive guide rails for trolleys and similar applications have been in use for many years. Typically, the rails come in segments of convenient length which are joined to provide a continuous mechanical rail for guiding the trolley and to provide a continuous electrical contact surface for sliding contact with an electrical current collector carried by the trolley. The rails often are made entirely from an electrically conductive material such as a suitable metal; however, rails built up from two or more different materials are also known. Rails with H-shaped cross-section have been used in which the abutting ends of the rail segments are held together by a pair of flat connector elements screwed to the section ends and positioned against the two inwardly bent protrusions on the uppermost legs of the H-shaped rail.

Rails having a tubular cross-section with an axial slot extending through the wall of the tube are desirable in some applications. Contact with the current collector of the trolley is made on the inside surface of the tube. Connecting segments of such tubular rails presents problems, however, since except for the slot in the tube there are no convenient protuberances, flanges or other features at the ends of the rail segments which readily facilitate connecting the segments.

DISCLOSURE OF THE INVENTION

A primary object of the present invention is to provide a simple connector apparatus for use with tubular rail segments having axially extending slots.

A further object of the invention is to provide such a connector in which relative movement of the rail segments due to thermal expansion and contraction is permitted without loss of mechanical integrity or electrical continuity.

Another object of the invention is to provide such a connector which is secure against torsional loading of the joint between rail segments.

These objects of the invention are given by way of example only; thus, other desirable objectives and advantages inherently achieved by the invention may occur to those skilled in the art. The scope of the invention is to be limited; however, only by the appended claims.

In the simplest embodiment of the invention, two tubular segments are provided, each having an axial slot extending through its wall, and the first being sized for insertion into the second. The first segment comprises at least one notch in its wall extending at least partially around its circumference. The second segment comprises at least one protuberance extending radially into its interior in position to fit into the notch in the first segment when the two are assembled. A third segment can be connected to the other end of the second segment by providing a further notch and protrusion pair.

The notches preferably terminate at the axial slots of the first and third segments and also extend through the walls thereof. The protrusions on the second segment preferably are formed as inwardly bent tongues of the wall material which have a minimum inner radial dimension corresponding to the inner radius of the first and third segments. To permit some relative axial movement of the segments due to thermal effects, the protrusions or tongues can be made somewhat narrower axially than the notches. By positioning the protrusions on opposite sides of the slot of the second segment and at opposite ends thereof, the first and third segments must be rotated oppositely to engage their notches with their respective protrusions. The second segment can be provided with a means for connection to an external source of electrical power, if desired.

BRIEF DESCRIPTION OF THE DRAWING

The single FIGURE shows an exploded, perspective view of one end of a first slotted tubular rail segment, a second slotted tubular connector segment, and a third slotted tubular rail segment, all positioned for assembly into the apparatus of the invention.

BEST MODE FOR CARRYING OUT THE INVENTION

In the FIGURE, as illustrated, the left end of a first slotted tubular rail segment 1 is shown axially positioned for insertion into a second slotted tubular connector segment 3 at one end thereof and a third slotted tubular rail segment 2 is shown positioned for insertion into the other end of connector segment 3. The segments preferably are of circular cross-section and made from copper or other conductive material. Rail segment 1 comprises at least one notch 4 extending through its wall and terminating with an opening into its axial slot 5. Notch 4 extends at least partially around the circumference of rail segment 1 and may, if desired, extend only partially through the thickness of the wall (not illustrated). Rail segment 2 comprises a similar notch 6 extending through its wall and terminating with an opening into its axial slot 6'. Notch 6 preferably is provided on the opposite side of axial slot 6' from the position of notch 4.

Rail segments 1 and 2 are joined end-to-end according to the invention by means of slotted tubular connector segment 3. A pair of protrusions or tongues 7 and 8 are provided in the wall of segment 3, preferably on opposite sides of its axial slot and positioned to extend radially inwardly into notches 4, 6 respectively, so that rail segments 1, 2 contact end-to-end. Tongues 7, 8 extend radially inwardly only to the point where they are flush with the inner surfaces of rail segments 1, 2.

Where long conductor rails are used, thermal expansion and contraction of the rail segments has been known to cause overloading of the rail connectors and even loss of electrical continuity in some prior art devices. This difficulty is avoided in part due to the large contact area among segments 1, 2 and 3. Also, by making the axial width of notches 4 and 6 somewhat greater than the axial width of protrusions 7 and 8, room for thermal expansion and contraction is provided. Alternatively, the widths of one notch and tongue pair can be made essentially the same to provide a tight fit at one end of connector segment 3, while the widths of the other notch and tongue pair are different to provide for thermal effects. In either case, the connector elements are preferably configured so that at the highest anticipated temperature, the ends of rail segments 1, 2 will just touch; and at the lowest anticipated temperature, the ends will be separated.

To assemble the apparatus, the end of rail segment 1 is inserted ino connector segment 3 so that edge 9 of slot 5 passes protrusion 7. When notch 4 and protrusion 7 are aligned, rail segment 1 is rotated relative to connector segment 3, in a manner similar to a bayonet joint, so that protrusion 7 enters notch 4 to provide a secure joint and so that the axial slots of the segments align. Rail segment 2 is assembled into the other that an opposite direction of rotation is required to move protrusion 8 into notch 6. This provision for opposite rotation at assembly renders the apparatus less sensitive to loosening due to torsional loading. Connector assembly 3 can be adapted for connection to an external source of electrical power, not shown, by soldering or otherwise attaching appropriately labeled lead wires to its exterior surface.

The very large contact surface between rail segments 1, 2 and connector segment 3 ensures that there will be continuity of current flowing along the assembled rail. The connector apparatus is very compact and may be assembled by hand without the use of tools. The connector apparatus also may be used at the end of the rail assembly by providing a connector segment 3 joined at only one end to a rail segment. Rail supports, not illustrated, may be used to prevent undesirable twisting of the rails in use.

Electrically conductive rail assemblies of the type which are assembled using the invention have a number of advantages. Due to the large contact area at each rail joint, the rail assembly has a favorable impedance value. In addition, it possesses a high mechanical rigidity so that rail supports are needed only at rather long intervals. The rounded contact surface 10 ensures that even if the current collector of the associated trolley, for example is improperly oriented as it extends through the axial slot 5, 6', good electrical contact results between the collector and surface 10. Thus, tilting or twisting of the current collector, should it occur, should not result in loss of electrical contact.

INDUSTRIAL APPLICABILITY

The invention is suited for use in situations where an electrical current collector is caused to move along an elongated current carrying track or rail made up of several rail segments. Those skilled in the art will appreciate, however, that the connector apparatus according to the invention has other potential applications within the scope of the appended claims.

Having disclosed my invention in sufficient detail to enable those skilled in the art to make and use it, I claim:

1. An improved electrical connector, comprising:
   a first segment of hollow electrically conductive tubing having a first axial slot extending through the wall thereof;
   at least one notch in said wall extending circumferentially at least partially around the exterior of said first segment;
   a second segment of hollow electrically conductive tubing having a second axial slot extending through the wall thereof, said second segment having an inner geometry sized to receive said first segment of hollow tubing;
   at least one first protrusion in said wall of said second segment extending radially into the interior thereof in position to fit into said at least one notch in said first segment when said first segment is inserted into said second magnet and rotated both to engage said at least one first protrusion with said at least one notch and to align said first and second axial slot;
   a third segment of hollow electrically conductive tubing of the same outer geometry as said first segment, said third segment having a third axial slot extending through the wall thereof;
   at least one notch in the wall of said third segment extending circumferentially at least partially around the exterior of said third segment; and
   at least one second protrusion in said wall of said second segment, at the opposite end thereof from said at least one first protrusion, said second protrusion extending radially into the interior of said second segment in position to fit into said notch in said third segment when said third segment is inserted into said second segment and rotated both to engage said at least one second protrusion with said at least one notch in the wall of said third segment and to align said first, second and third axial slots.

2. Apparatus according to claim 1, wherein said at least one notch in said first and third segments terminates at said first and third axial slots, respectively.

3. Apparatus according to claim 2, in which said at least one first and second protrusions each comprise a tongue element extending from said wall of said second segment.

4. Apparatus according to claim 3, wherein said at least one notch in said first and third segments extends through said walls of said first and third segments and said tongue elements extend to the respective inner surfaces of said first and third segments.

5. Apparatus according to claim 3, wherein the axial width of said at least one protrusion at least at one end of said second segment is less than the axial width of the corresponding at least one notch in said first and third segments.

6. Apparatus according to claim 1, wherein the axial width of said at least one protrusion at least at one end of said second segment is less than the axial width of the corresponding at least one notch in said first and third segments.

7. Apparatus according to claim 1, wherein said first and second protrusions are on opposite sides of said second axial slot of said second element and the respective notches in said first and third segments are on opposite sides of said first and third axial slots from their respective protrusions, whereby said first and third segments must be rotated in opposite directions to engage the respective notches and protrusions.

8. Apparatus according to claim 1, wherein said second segment is adapted for connection to a source of electrical current.

* * * * *